(12) United States Patent
Inturi et al.

(10) Patent No.: US 9,142,226 B2
(45) Date of Patent: Sep. 22, 2015

(54) THIN FILM WITH TUNED GRAIN SIZE

(75) Inventors: Venkateswara Rao Inturi, Shakopee, MN (US); Wei Tian, Eden Prairie, MN (US); Huaqing Yin, Eden Prairie, MN (US); Michael C. Kautzky, Eagan, MN (US); Mark Thomas Kief, Lakeville, MN (US); Meng Zhu, Bloomington, MN (US); Eliot Lewis Cuthbert Estrine, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 165 days.

(21) Appl. No.: 13/539,026

(22) Filed: Jun. 29, 2012

(65) Prior Publication Data

US 2014/0004387 A1    Jan. 2, 2014

(51) Int. Cl.
| | |
|---|---|
| *G11B 5/127* | (2006.01) |
| *H01L 43/12* | (2006.01) |
| *G11B 5/31* | (2006.01) |
| *H01F 10/16* | (2006.01) |
| *H01F 41/18* | (2006.01) |

(52) U.S. Cl.
CPC ............ *G11B 5/1278* (2013.01); *G11B 5/3103* (2013.01); *G11B 5/3163* (2013.01); *H01F 10/16* (2013.01); *H01F 41/18* (2013.01)

(58) Field of Classification Search
None
See application file for complete search history.

(56) References Cited

U.S. PATENT DOCUMENTS

| | | | |
|---|---|---|---|
| 4,103,315 A * | 7/1978 | Hempstead et al. | 360/110 |
| 5,075,280 A * | 12/1991 | Pisharody et al. | 505/171 |
| 5,590,389 A | 12/1996 | Dunlop et al. | |
| 5,948,553 A | 9/1999 | Kamijo | |
| 6,139,951 A | 10/2000 | Chen et al. | |
| 6,342,311 B1 * | 1/2002 | Inturi et al. | 428/815.2 |
| 6,562,199 B2 * | 5/2003 | Shimazawa et al. | 204/192.1 |
| 6,636,460 B2 | 10/2003 | Akiyama et al. | |
| 6,740,397 B1 | 5/2004 | Lee | |
| 6,778,358 B1 * | 8/2004 | Jiang et al. | 360/125.5 |
| 6,791,796 B2 | 9/2004 | Shukh et al. | |
| 6,908,517 B2 | 6/2005 | Segal | |
| 8,064,161 B2 * | 11/2011 | Kudo et al. | 360/125.02 |
| 8,619,394 B1 * | 12/2013 | Park et al. | 360/324.12 |
| 2002/0054462 A1 | 5/2002 | Sun et al. | |
| 2003/0209295 A1 * | 11/2003 | Cooper et al. | 148/311 |

(Continued)

FOREIGN PATENT DOCUMENTS

| | | |
|---|---|---|
| JP | 63-311613 | 12/1988 |
| JP | 2002-151760 A | 5/2002 |

(Continued)

OTHER PUBLICATIONS

R. L. Anderson, et al., "Annealing Behavior of Electroplated Permalloy Thin Films," Journal of Electronic Materials, 1973, pp. 161, vol. 2, No. 2, American Institute of Mining, Metallurgical, and Petroleum Engineers, Inc.

(Continued)

*Primary Examiner* — Kevin Bernatz
(74) *Attorney, Agent, or Firm* — Hall Estill Attorneys at Law

(57) ABSTRACT

An apparatus and associated method provides a magnetic writing element that may have at least a write pole tuned to a predetermined first grain size with a cryogenic substrate temperature. A magnetic shield can be formed with a predetermined second grain size that is tuned with the cryogenic substrate temperature.

20 Claims, 4 Drawing Sheets

(56) References Cited

U.S. PATENT DOCUMENTS

| | | | |
|---|---|---|---|
| 2007/0285835 A1* | 12/2007 | Sun et al. | 360/126 |
| 2008/0253024 A1 | 10/2008 | Miyata et al. | |
| 2009/0162948 A1* | 6/2009 | Henrichs | 438/3 |
| 2010/0214693 A1* | 8/2010 | Contreras et al. | 360/125.03 |
| 2012/0164486 A1* | 6/2012 | Bonhote et al. | 428/812 |
| 2013/0288078 A1* | 10/2013 | Zhu et al. | 428/827 |

FOREIGN PATENT DOCUMENTS

| | | |
|---|---|---|
| JP | 2004-295987 A | 10/2004 |
| JP | 2011-149100 A | 8/2011 |
| KR | 10-2010-0043146 | 4/2010 |

OTHER PUBLICATIONS

T. Furubayashi, et al., "Structure and transport properties of current-perpendicular-to-plane spin valves using Co2FeAl0.5Si0.5 and Co2MnSi Heusler alloy electrodes," Journal of Applied Physics 107, 2010, pp. 0-7, American Institute of Physics.

G. Herzer, "Grain Structure and Magnetism of Nanocrystalline Ferromagnets," IEEE Transactions on Magnetics, Sep. 1989, pp. 3327-3329, vol. 25, No. 5, IEEE.

S. Ikeda, et al., "Tunnel magnetoresistance of 604% at 300K by suppression of Ta diffusion in CoFeB/MgO/CoFeB pseudo-spin-valves annealed at high temperature," Applied Physics Letters 93, 2008, pp. 0-3, American Institute of Physics.

V. R. Inturi, et al., "The effect of Nitrogen on Soft-Magnetism in FeTaN Films," IEEE Transactions on Magnetics, Nov. 1995, pp. 2660-2662, vol. 31, No. 6, IEEE.

H. S. Jung, et al., "FeTaN/IrMn Exchange-Coupled Multilayer Films as Soft Underlayers for Perpendicular Media," IEEE Transactions on Magnetics, Jul. 2001, pp. 2294-2297, vol. 37, No. 4, IEEE.

Andrew S. Kao, et al., "Effect of Magnetic Annealing on Plated Permalloy and Domain Configurations in Thin-Film Inductive Head," IEEE Transactions on Magnetics, Nov. 1991, pp. 4452-4457, vol. 27, No. 6, IEEE.

Ladislav Pust, et al., "Domain control in magnetic shields using patterned permanent magnet underlayer," Journal of Applied Physics, May 2002, pp. 6940-6942, vol. 91, No. 10, American Institute of Physics.

R. A. Ristau, et al., On the relationship of high coercivity and L10 ordered phase in CoPt and FePt thin films, Journal of Applied Physics, Oct. 1999, pp. 4527-4533, vol. 86, No. 8, American Institute of Physics.

* cited by examiner

US 9,142,226 B2

THIN FILM WITH TUNED GRAIN SIZE

SUMMARY

Various embodiments of the present disclosure are generally directed to a magnetic element that is capable of enhanced data recording.

In accordance with various embodiments, a magnetic writing element may have at least a write pole tuned to a predetermined first grain size with a cryogenic substrate temperature. A magnetic shield can be formed with a predetermined second grain size that is tuned with the cryogenic substrate temperature.

DETAILED DESCRIPTION

With industry advancing towards data storage devices with higher data capacity, transfer rates, and reliability, product design focuses on reducing the size of data bits while increasing data access rates from a data storage media. Such miniscule operational environments combined with precise timing windows can place added emphasis on the magnetic behavior of various data reading and writing elements. For example, when residual magnetic flux is present after a data bit is programmed, an erase after write (EAW) situation may occur as an unpowered magnetic writer emits flux that inadvertently erases data bits.

Reduced operating environments can further correspond to the use of high temperature annealing for various magnetic layers of a data sensing element, which may produce abnormal grain growth in underlying shield layers and deteriorate soft magnetic properties of magnetic shield materials. As such, there is increasing industry demand for data writing elements with controlled EAW and magnetic shield layers with increased thermal stability against annealing.

Accordingly, a magnetic writing element may be configured with at least a write pole that is tuned to a predetermined first grain size with a cryogenic substrate temperature. The ability to tune the grain size of the write pole by controlling substrate temperature can allow for the construction of a writing element that exhibits performance, such as low easy axis coercivity of about 8 Oersted, hard axis coercivity of less than 1 Oersted, and uniaxial anisotropy of approximately 23 Oersted, commensurate with reduced form factor data storage devices. Also, by configuring the write pole with a predetermined grain size, EAW may be improved through faster relaxation of magnetization at a write pole tip.

The construction of a magnetic element in accordance with various embodiments can improve magnetic properties of write pole material to reduce EAW while increasing thermal stability of shield materials. The deposition of thin films on substrates cooled to cryogenic temperatures, such as 50K, allows for adaptation of the sputtering process, in which the mobility of deposited atoms is greatly reduced. Such adaptation can inhibit surface and bulk diffusion and prevent small grains from coalescing to form larger grains. Combined with a high sputtering rate, surface diffusion of the deposited atoms can further be inhibited by burying deposited atoms before they can migrate and aid grain growth. As a result, the small grains, which can be characterized as nano-crystalline grains, may help to reduce the surface/interference roughness between layers and improve the soft magnetic properties of the magnetic thin films. The small grains and fast deposition also may introduce more grain boundaries and imperfections that can impede grain growth and improve thermal stability of the thin film during high temperature annealing.

Figure 1:
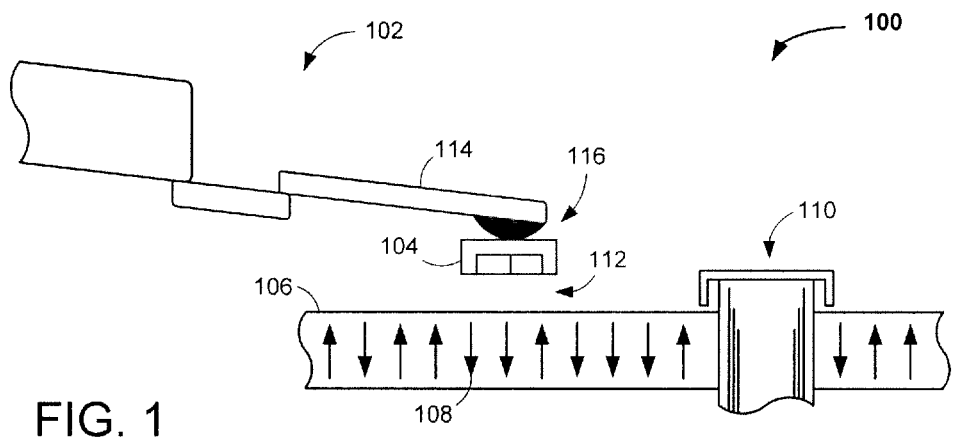
FIG. 1 is a block representation of an example portion of a data storage device.

While an EAW condition can occur in a variety of data storage environments, FIG. 1 generally illustrates an example data transducing portion 100 of a data storage device. The transducing portion 100 is shown in an environment in which various embodiments of the present invention can be advantageously practiced. It will be understood, however, that the various embodiments of this disclosure are not so limited by such environment and can be implemented to alleviate a variety of inadvertent magnetic flux generation conditions.

The transducing portion 100 has an actuating assembly 102 that positions a transducing head 104 over programmed data bits 106 present on a magnetic storage media 108. The storage media 108 is attached to a spindle motor 110 that rotates during use to produce an air bearing surface (ABS) 112 on which a slider portion 114 of the actuating assembly 102 flies to position a head gimbal assembly (HGA) 116, which includes the transducing head 104, over a desired portion of the media 108.

The transducing head 104 can include one or more transducing elements, such as a magnetic writer and magnetically responsive reader, which operate to program and read data from the storage media 108, respectively. In this way, controlled motion of the actuating assembly 102 induces the transducers to align with data tracks (not shown) defined on the storage media surfaces to write, read, and rewrite data.

Figure 2:
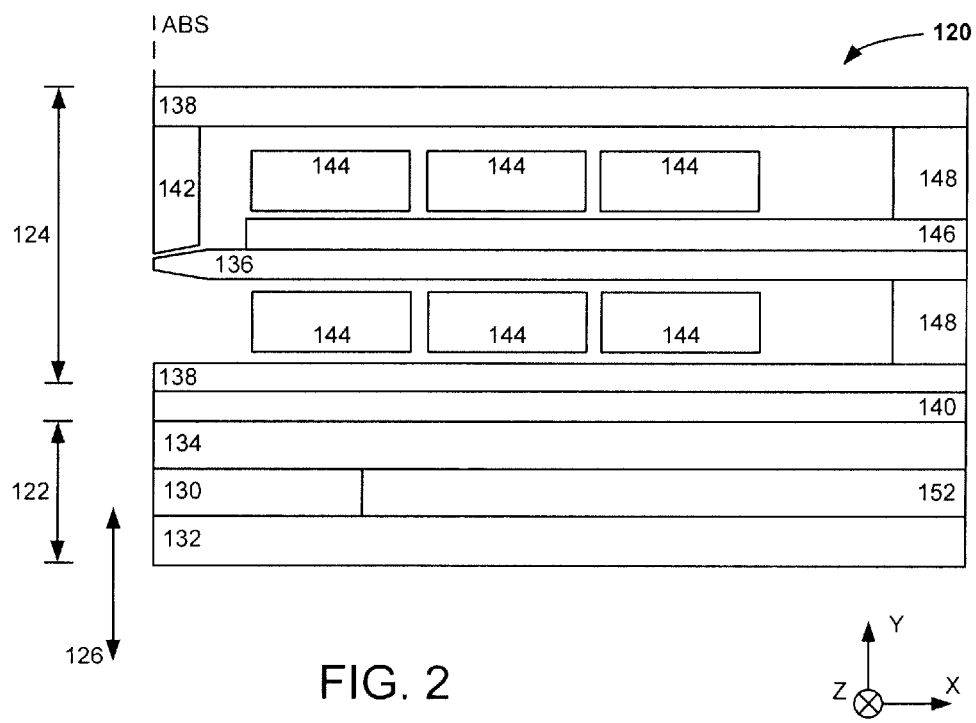
FIG. 2 generally illustrates a cross-section view of an example magnetic element capable of being used in the portion of the data storage device displayed in FIG. 1.

FIG. 2 displays a cross-sectional block representation of an embodiment of a transducing head 120 that is capable of being used in the actuating assembly of FIG. 1. The head 120 can have one or more magnetic elements, such as the magnetic reader 122 and writer 124, which can operate individually, or concurrently, to write data to, or retrieve data from, an adjacent storage media, such as media 108 of FIG. 1. Each magnetic element 122 and 124 is constructed of a variety of shields that act to define a predetermined data track 126 of the corresponding data media on which data bits are sensed and programmed by the respective magnetic elements 122 and 124.

The magnetic reading element 122, as shown, has a magnetoresistive layer 130 disposed between bottom and top shields 132 and 134. Meanwhile, the writing element 124 has a write pole 136 and at least one return pole 138 that creates a writing circuit to impart a desired magnetic orientation to the adjacent storage media. While not limiting, some embodiments use the writing element 124 to write data perpendicularly to the adjacent data media. Such perpendicular recording can allow for more densely packed data bits, but can also increase the effect of EAW as multiple data bits can be concurrently influenced by residual magnetic flux.

In another non-limiting embodiment, the writing element 124 can include at least two return poles 138 positioned contactingly adjacent a non-magnetic spacer layer 140 and an air bearing surface (ABS) shield 142. The writing element 124 may further include a coil 144 that can be one or many individual wires and a yoke 146 that attaches to the write pole 136 and operates with the coil 144 to impart a magnetic flux that travels from the write pole 136 through conductive vias 148 to conclude at the return poles 138. It should be noted that the various aspects of the head 120 can be characterized as either uptrack or downtrack, along the Y axis, depending on the motion of the head.

Figure 3:
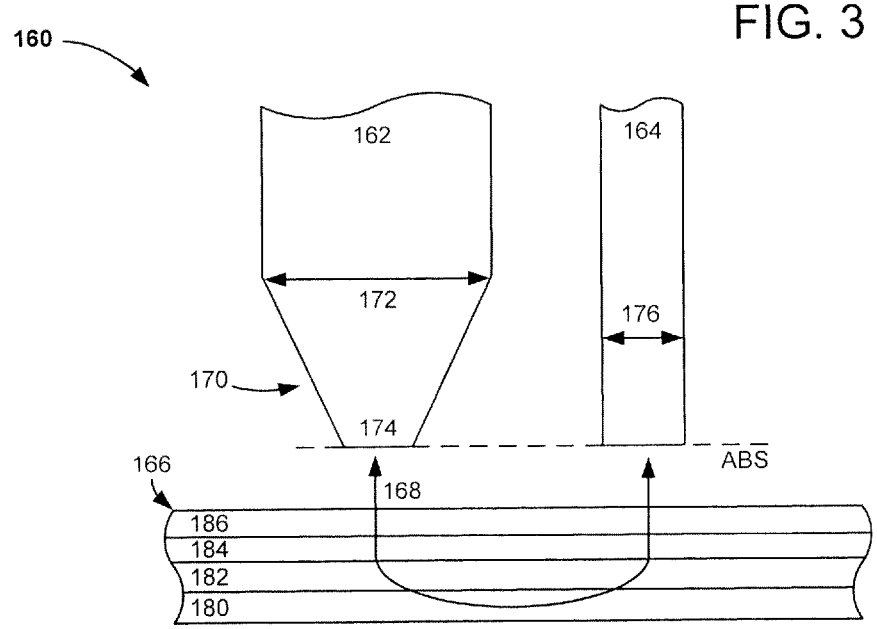
FIG. 3 shows an example block representation of an example magnetic writing element.

FIG. 3 shows a block representation of a data writing portion 160 of a data storage device that generally illustrates interaction between write and return poles 162 and 164 through a data storage media 166. During operation, the data writing portion 160 can be positioned in relation to the data storage media 166 to allow a magnetic pathway 168 to flow from the write pole 162 through the media 166 to the return pole 164, or vice versa. The write pole 162 can be constructed with a pole tip 170 that corresponds to a reduction in pole width from a body distance 172 to a tip distance 174 at an ABS. Such a shaped pole tip 170 can focus the emission of magnetic flux and the size of the magnetic pathway 168 on the media 166. Much like the tapered width tip 170 of the write pole 162, the return pole 164 can be configured with a varying width, or with a uniform return width 176, as shown.

Regardless of the configuration of the write and return poles 162 and 164, the data writing portion 160 can be tuned so that the magnetic pathway 168 engages a plurality of layers of the data storage media 166. While the number, type, and configuration of the various layers of the data storage media 166 are not limited, FIG. 3 displays a soft magnetic underlayer 178 stacked beneath first and second interlayers 180 and 182 as well as a recording layer 184. The layer configuration displayed in FIG. 3 can allow for perpendicular recording of data bits as the magnetic pathway 168 completes a circuit from the write pole 162, across the ABS, through the soft magnetic underlayer 178 to the return pole 164, or vice versa.

The speed and accuracy in which the write and return poles 162 and 164 engage the various layers of the data storage media 166 can correspond with the maximum data bit density of the media 166. With data bits being pushed to be smaller and media 166 spinning at an increasing rate in modern data storage devices, the ability of the write and return poles 162 and 164 to change magnetization becomes a chokepoint to higher areal bit densities. Hence, tuning the write and return poles 162 and 164 to a predetermined grain size may allow magnetization to more readily change and data writing speed to increase.

Figure 4:
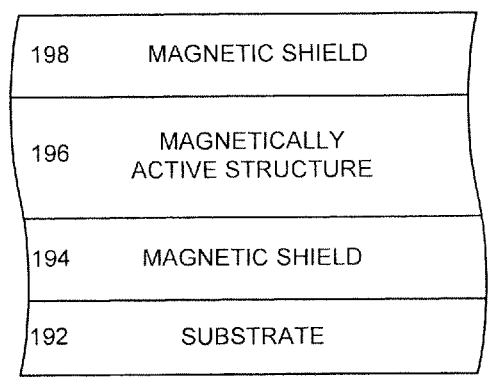
FIG. 4 displays a profile of a portion of an example magnetic element.

FIG. 4 provides a portion of a writing or reading element 190 as tuned during construction in accordance with various embodiments. The writing or reading element 190 can be constructed with any number and type of layers and in a variety of non-limiting manners, such as sputtering and vapor deposition. In the embodiment shown in FIG. 4, a substrate 192 provides a foundation on which a bottom magnetic shield 194, a magnetically active structure 196, and atop magnetic shield layer 198 are formed. The active magnetic structure 196 may be a magnetoresistive reader stack or a write pole in various embodiments.

With greater numbers of data tracks on a data storage media, the ability to form the write pole 196 to be highly permeable for magnetic fields and have a reduced width with soft magnetic properties can allow for accurate data writing in increasing areal density data devices. Further, the ability to tune the width and magnetic properties by controlling the grain size of the write pole 196 allows the write pole 196 to be a solid feature without lamination or doping into the core structure, which simplifies fabrication and provides more accurate construction.

In various embodiments, the bottom shield layer 194 under the active magnetic structure 196 is tuned to a predetermined grain size by controlling the temperature of the substrate 192 during deposition. That is, the magnetic shield 194 can be deposited while the substrate 192 is maintained at a first temperature, such as 50 K, and the active magnetic structure is subsequently deposited while the substrate is maintained at a second temperature, such as 50 K. Such substrate temperature manipulation provides the ability to control the grain size and influence magnetics in magnetoresistive reader stack, writer pole, and shield materials.

The manipulation of substrate temperature may additionally be used in some embodiments to form different grain sizes for the various data writing or reading element 190 layers. For example, the magnetic shields 194 and 198 as well as the magnetically active structure 196 may have different respective grain sizes due at least in part to being deposited while the substrate 192 is maintained at differing cryogenic temperatures, which are temperatures that are less than room temperature. However, not all layers of the data element 190 must be deposited while the substrate 192 is maintained at below room temperature. That is, the substrate temperature could vary and be at or above room temperature for some layers and be at cryogenic temperatures for other layers. It should be noted that the various data element 190 layers are not limited to the size and orientation shown in FIG. 4 and each layer can be formed of unique or common materials, such as, but not limited to, NiFe for the magnetic shields 194 and 198 and FeCo for the magnetically active structure 196 for writer poles.

The use of cryogenic substrate temperatures during data element 190 fabrication can correspond to reduced grain size and soli magnetic properties at least for the magnetically active structure 196 by annealing the various data element 190 layers from the cryogenic substrate temperature to room temperature. It can be appreciated that the warming of the magnetically active structure 196 up to room temperature can provide simple and efficient grain formation without movement of the data element 190 or use of heating elements. However, some embodiments allow the data element 190 to naturally rise to room temperature then provide further annealing with temperatures elevated above room temperature, which the predetermined grain size of the magnetic shields can tolerate without abnormal grain growth.

In various embodiments, the cryogenically deposited bottom magnetic shield layer 194 is artificially annealed to approximately 400° C. for about 2 hours, which can produce easy axis coercivity of about 1.0 Oersted and hard axis coercivity of about 0.12 Oersted. Contrastingly, an electroplated shield, such as NiFe, would suffer from the 400° C., 2 hour annealing to produce easy axis coercivity of 2.7 Oersted and hard axis coercivity of 0.38 Oersted.

It can be appreciated that grain size can correlate to surface roughness. The tuning of grain size can produce a variety of different predetermined surface roughness that can correspond with softer magnetic properties, higher resistance to grain growth at high annealing temperatures.

Figure 5:
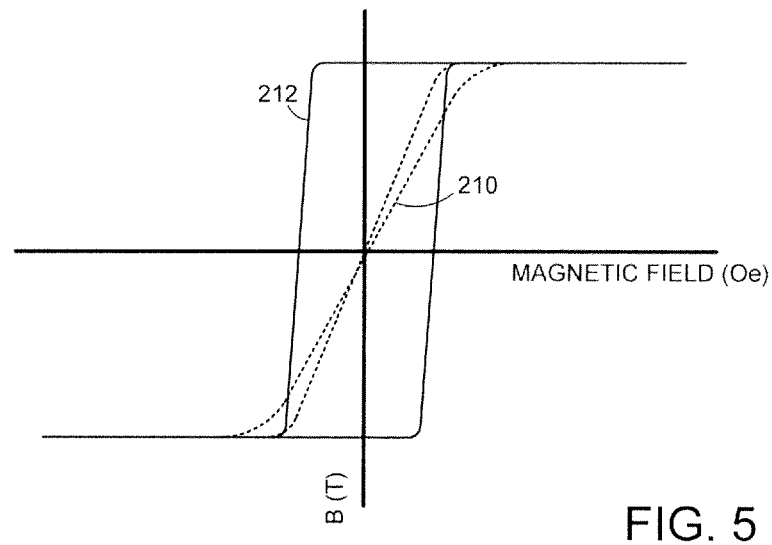
FIG. 5 plots performance data generally associated with magnetic elements constructed and operated in accordance with various embodiments.
Figure 6:
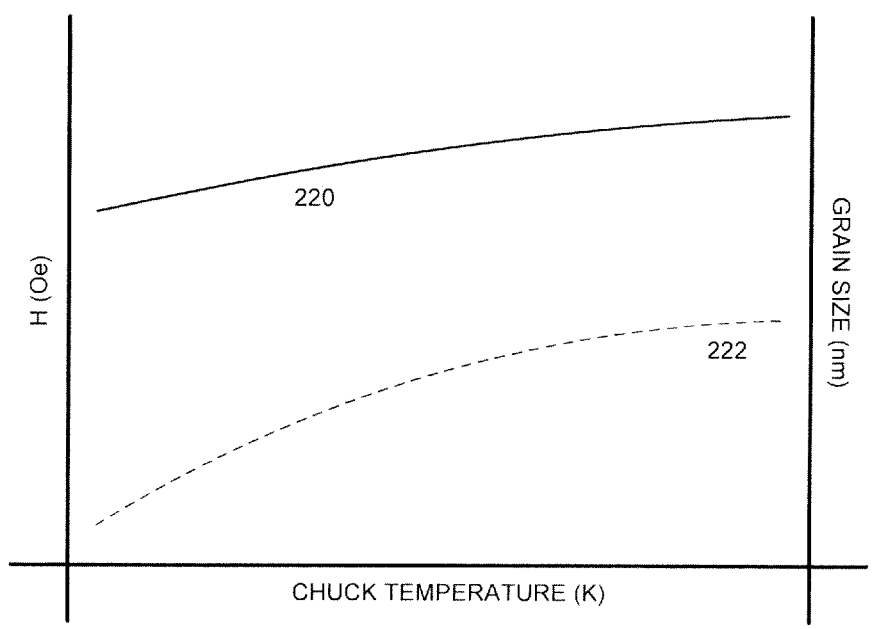
FIG. 6 graphs various operational characteristics of a magnetic element constructed and operated in accordance with various embodiments.

FIGS. 5 and 6 respectively plot example magnetic characteristics possible by tuning a write pole with cryogenic substrate temperatures. In FIG. 5, a FeCo thin film was deposited on a substrate maintained at approximately 50 K, which can produce a 2.4 T solid film with grain size providing hysteresis loops as shown. Specifically, segmented loop 210 illustrates a hard axis coercivity of less than 1 Oersted while solid loop 212 shows an easy axis coercivity of less than 8 Oersted. Such magnetic performance supports the ability to tune a write pole with smaller grain size while without losing magnetic moment of the film, as opposed to the loss of magnetic moment that occurs when doping materials into the write pole to reduce grain size.

The hystresis loops corresponding to thin film magnetic shield formation also support the ability to produce magnetic shield layer with high permeability, low coercive field, and low magnetic dispersion despite high temperature annealing by reducing the grain size with cryogenic substrate temperatures.

FIG. 6 graphs the correlation of the easy axis coercivity of an example FeCo write pole material (line 220) and grain size (line 222) with chuck temperature of a substrate. As can be appreciated, reduction in chuck temperature corresponds to reduced grain size and reduced coercivity, which illustrates the soft magnetic properties and small grain sizes provided by deposition at cryogenic substrate temperatures, such as 50 K. In some embodiments, write pole and return pole are tuned to different predetermined grain sizes that exhibit different magnetic properties and grain size through the modification of the substrate temperature in accordance with lines 220 and 222 of FIG. 6.

Figure 7:
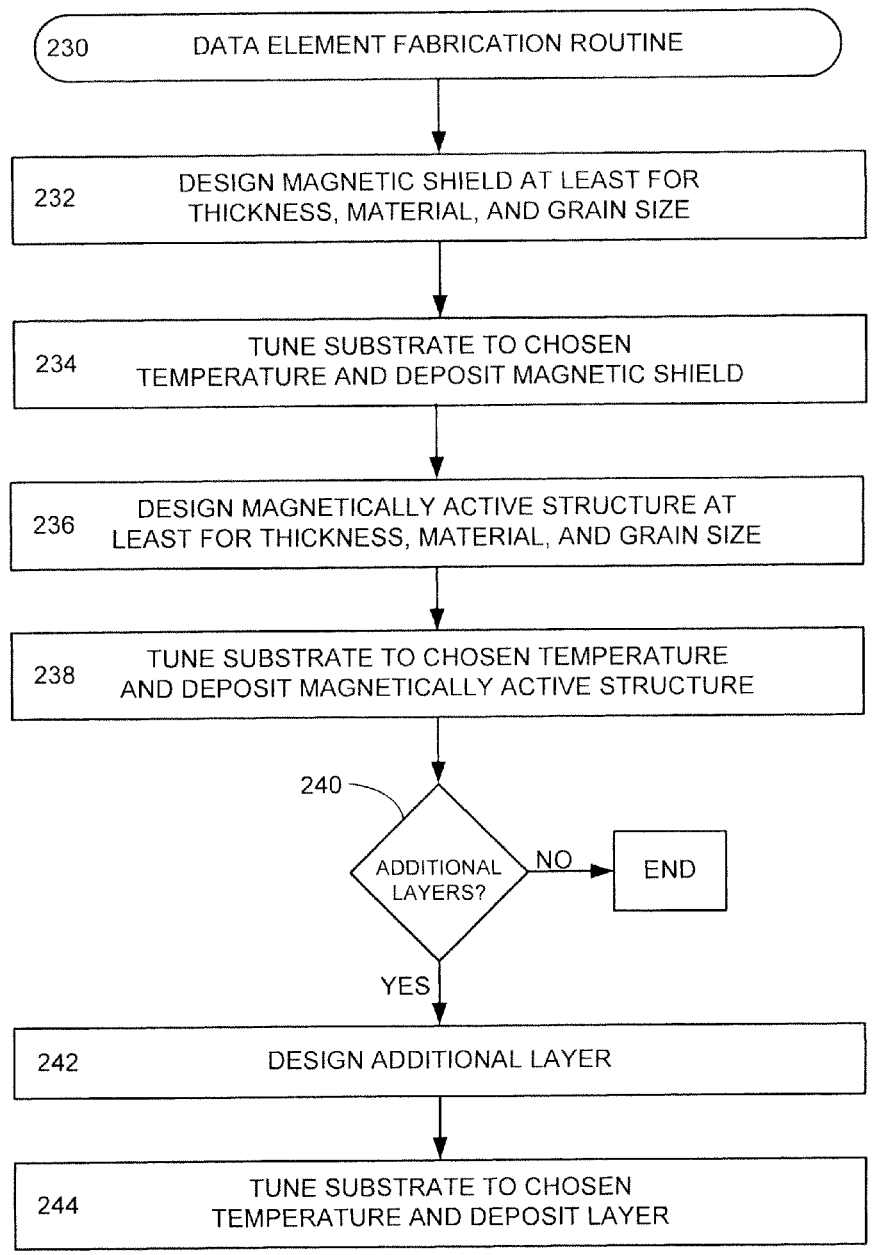
FIG. 7 provides a flowchart of a magnetic element fabrication routine conducted in accordance with various embodiments of the present invention.

While not required or limited to a particular means for constructing a writing element with a tuned write pole, FIG. 7 provides an example writing element fabrication routine 230 performed in accordance with various embodiments. The routine 230 initially evaluates a magnetic shield configuration in decision 232, which may determine the thickness, material, and grain size of the shield. With the magnetic shield design solidified, step 234 tunes a substrate to a temperature that corresponds to the grain size and magnetic properties determined in decision 232.

Decision 236 then designs a write pole with specific consideration for the grain size and magnetic behavior at a pole tip, such as pole tip 170 of FIG. 3. Determination of the grain size and magnetic properties can be correlated with a substrate temperature, such as via the operational graph of FIG. 6, that is subsequently brought to reality in step 238 with the deposition of the write pole. The substrate temperature can be maintained or altered while decision 240 evaluates if additional layers are to be deposited atop the write pole. If additional layers are chosen, the substrate is tuned in step to one or more temperatures that provide the designed grain size and magnetic characteristics for at least one additional layer.

Through controlled operation, routine 230 can fabricate a writing element with any number of layers that, along with the write pole, may be individually or collectively tuned to predetermined grain sizes and magnetic behavior by setting the substrate to cryogenic temperatures. However, the routine 230 is not limited to the process shown in FIG. 7 as the various decisions and steps can be omitted, changed, and added. For example, decisions 232, 236, and 240 can be conducted collectively prior to the deposition of any writing element layers. In another example embodiment, the write pole is deposited on a tuned substrate with a seed material, such as Ru and Ta, and not a magnetic shield being disposed between the write pole and the substrate.

It can be appreciated that the configuration and material characteristics of the magnetic element described in the present disclosure allows for enhanced magnetic programming by providing a write pole that has reduced grain size and soft magnetic properties, which can correspond to reduced erasure after writing in high areal density data storage devices. Moreover, the ability to tune and optimize various layers of a data writing element allows for precise matching of magnetic operation during data writing with data storage media. In addition, while the embodiments have been directed to magnetic programming, it will be appreciated that the claimed technology can readily be utilized in any number of other applications, such as data sensing and solid state data storage applications.

It is to be understood that even though numerous characteristics and advantages of various embodiments of the present disclosure have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed. For example, the particular elements may vary depending on the particular application without departing from the spirit and scope of the present technology.

What is claimed is:

1. A data storage device comprising a write pole having a first grain size and contacting a magnetic shield having a second grain size, the magnetic shield contacting a substrate having a temperature of less than 100 K, the first grain size corresponding with a magnetic moment of approximately 2.4 T, an easy axis magnetic coercivity of approximately 8 Oe, a hard axis magnetic coercivity of less than 1 Oe, and a uniaxial anisotropy of approximately 23.

2. The data storage device of claim 1, wherein the temperature of the substrate is below 75 K.

3. The data storage device of claim 1, wherein the temperature of the substrate is approximately 50 Kelvin.

4. The data storage device of claim 1, wherein the write pole is a single continuous layer.

5. The data storage device of claim 1, wherein the write pole is FeCo.

6. The data storage device of claim 1, wherein the write pole comprises a FeCo material or FeCoNi material.

7. The data storage device of claim 1, wherein the temperature of the substrate is maintained for a substrate layer on which the write pole is deposited.

8. The data storage device of claim 7, wherein the substrate layer is one of the group of NiFe, CoFe, CoNiFe, Ru, Co, Au, and Pd.

9. The data storage device of claim 1, wherein the write pole comprises nano-crystalline grains.

10. The data storage device of claim 1, wherein the write pole and magnetic shield each have air bearing surfaces.

11. The data storage device of claim 1, wherein a return pole is separated from the write pole, the return pole having a third grain size that is different than the first grain size.

12. A magnetic writing element comprising a write pole adjacent a magnetic shield, the write pole and magnetic shield respectively having first and second grain sizes, the magnetic shield and disposed between a substrate and the write pole, the substrate having a temperature of approximately 50 K, the first and second grain sizes being different and the first grain size corresponding with a magnetic moment of approximately 2.4 T, an easy axis magnetic coercivity of approximately 8 Oe, a hard axis magnetic coercivity of less than 1 Oe, and a uniaxial anisotropy of approximately 23 Oe.

13. The magnetic writing element of claim 12, wherein the magnetic shield is formed of a different material than the write pole.

14. The magnetic writing element of claim 12, wherein the magnetic shield and write pole are formed separately.

15. The magnetic writing element of claim 12, wherein the magnetic shield comprises material chosen from the group of NiFe, CoNiFe, NiFeO, NiFeNb, and other crystalline materials.

16. The magnetic writing element of claim 12, wherein the first grain size is approximately 200 Angstroms.

17. A method comprising:
 cooling a substrate to a cryogenic temperature of approximately 50 K; and
 depositing a magnetic shield followed by a write pole on the substrate, the write pole having a grain size corresponding with a magnetic moment of approximately 2.4 T, an easy axis magnetic coercivity of approximately 8 Oe, a hard axis magnetic coercivity of less than 1 Oe, and a uniaxial anisotropy of approximately 23 Oe while the cryogenic temperature is maintained.

18. The method of claim 17, wherein a magnetic shield formed adjacent the write pole is warmed to room temperature and subsequently annealed at approximately 400° C. for approximately 2 hours to reduce magnetic shield defects.

19. The method of claim 17, further comprising depositing a magnetic shield with the grain size on the substrate with a sputtering having a sputtering geometry with normal incidence of flux to reduce lateral mobility of sputtered magnetic shield material.

20. The method of claim 17, further comprising depositing a seed layer with the grain size for electroplating, epitaxy, or vacuum deposition.

* * * * *